Dec. 4, 1945.  W. C. GRABAU  2,390,214
VOLTAGE REGULATOR
Filed June 24, 1942
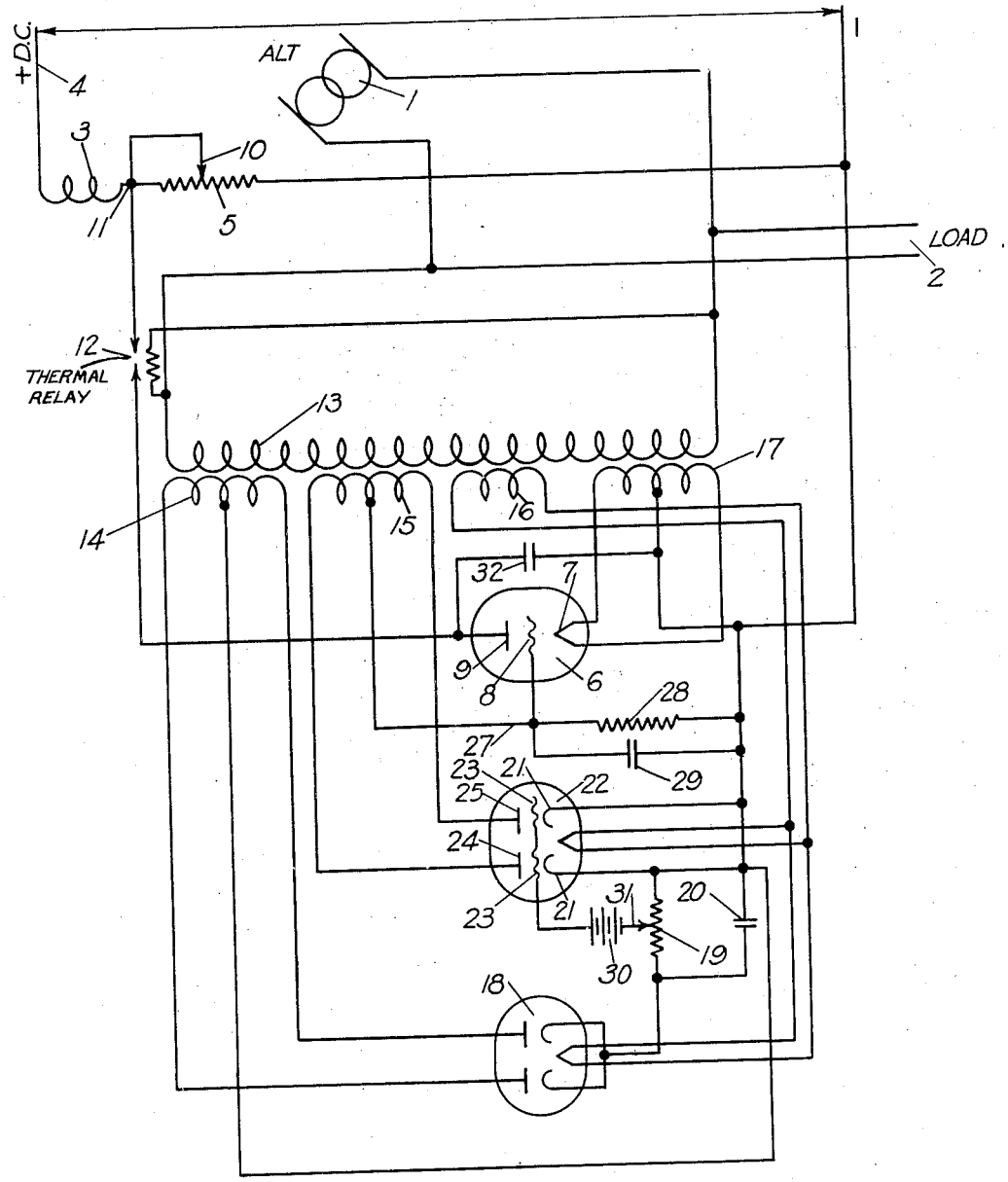
INVENTOR
WILLIAM CHRISTIAN GRABAU
BY
*Ezekiel Wolf*
ATTORNEY Patented Dec. 4, 1945

2,390,214

UNITED STATES PATENT OFFICE 2,390,214

VOLTAGE REGULATOR

William Christian Grabau, Brighton, Mass., assignor to Submarine Signal Company, Boston, Mass., a corporation of Maine Application June 24, 1942, Serial No. 448,307

5 Claims. (Cl. 171—119)

The present invention relates to control of electrical apparatus and more particularly to control of alternating current voltage supply source.

The present invention is a modification in part of the arrangement shown in my copending applications Serial No. 405,652, filed August 6, 1941, which has issued as Patent 2,356,397, dated August 22, 1944, and No. 432,982, filed March 2, 1942, which has issued as Patent 2,352,-626, dated July 4, 1944. In the earlier filed application the voltage and frequency regulation is obtained by the use of tuned circuits ultimately controlling variations of resistance in the field circuit of a supply source.

In the present application the field resistances are controlled through a control circuit regulated from the alternating current voltage in accordance with the features employed in the application Serial No. 432,982. Numerous advantages are obtained in the present combination. With small and slow variations in voltage of the alternating source rapid reactive effects are produced to vary the field current and thereby maintain the alternating voltage source constant. The control is of such a nature that for accelerated voltage variations, accelerated corrective effects may be produced so that the overall fluctuation of voltage is held at a minimum.

The present invention will be more fully understood with reference to the drawing illustrating an embodiment of the same in which the figure shows a schematic wiring diagram of the system for controlling the alternating voltage supply source.

In the figure, 1 shows an alternator which may be driven from any desired prime mover, as, for instance, a motor or a turbine, and which supplies alternating current to a load 2. The magnetic field derived from the coil 3 of the alternator may be supplied from a direct current source 4, which coil may be placed in series with a resistance 5, the field coil and resistance being connected across the direct current supply source 4. A gaseous control tube 6, which has a cathode 7, control electrode 8 and anode 9, may have its cathode-anode circuit connected across the field resistance 5, thereby being energized by the voltage equal to the drop in the field resistance. An adjustable tap 10 may be connected from one side 11 of the anode circuit to any point along the resistance 5 so as to cut out more or less of the resistance in series with the field 3. A thermal relay 12 may be used in the usual manner in a cathode-anode circuit of the tube.

The gaseous control tube 6 is controlled, as will be presently explained, through a vacuum tube control circuit for governing the biasing potential on the control grid 8 for controlling the operation of the gaseous tube.

The alternating current voltage by which the system is controlled is supplied through the transformer 13 connected across the alternating current supply means. This transformer 13 has a plurality of secondaries 14, 15, 16 and 17. The secondary winding 14 feeds a rectifier tube 18 across the output of which is a resistance 19 shunted by a condenser 20. As the alternating current voltage increases, the voltage across the resistance 19 increases and therefore the positive bias on the grids 23 of the double triode 22. This double triode is provided with cathodes 21, 21 which may be tied together and anodes 24 and 25 which are connected to the terminals of the secondary winding 15, thereby establishing between the cathode and anode through the connector 27 and the shunt circuit made up of the resistance 28 and the capacity 29, connected to the cathode, an alternating potential. This arrangement makes a full-wave device of the double triode 22 since during one half of the cycle the anode 24 becomes positive and therefore conductive, while during the other half of the cycle the anode 25 becomes positive and therefore conductive.

The grids 23 which are connected together are connected to one terminal of a battery 30 the other terminal of which is connected by an adjustable tap 31 which may be adjusted to any desired position along the resistor 19. The position of the tap 31 may be chosen together with the position of the tap 10 on the field resistance 5 to establish the desired voltage and control. The battery 30 establishes the negative bias on the grid 23 which is balanced by the positive bias established by the drop in the resistor 19 from the cathode to the point of the tap 31. These two biases are so balanced with respect to each other that when the voltage has the magnitude normally established for a certain voltage, the tube 6 will be conductive for a portion of the time. An increase in voltage will increase the positive bias on the grid 23, thus increasing the negative bias on the resistor 28 and cutting down thereby the proportionate time of discharge or conduction across the tube 6. This means that the resistance 5 remains for a longer time in series with the field 3 and therefore tends to hold the field current at a lower value with the resultant lower generated voltage, reducing thereby the positive bias established by the resistor 19 to bring the voltage regulation back to normal. If, on the other hand, the voltage in the resistor 19 decreases, the current flowing through the resistor 28 is decreased and the tube 6 becomes conductive for a longer period of time, thus increasing the flow of current in the field winding 3 and increasing the generated voltage, bringing the regulation back to its normal value.

It has been mentioned in the above description that a direct current potential is applied between the cathode 7 and the anode 9 of the conduction tube 6. Across these electrodes there is also provided a condenser 32. When the tube 6 discharges because of the lowering of the negative bias on the grid, the effective resistance of the tube is further depressed by the discharging condenser 32, creating thereby practically a short-circuit about the resistance element 5 lowering the potential across the tube 6 to a point where the discharge is extinguished. In the present system, therefore, for alternating voltage regulation the alternating cycle is not depended upon to extinguish the gaseous discharge but this is independently effected by the adjustment of the values of the capacity 32 and the potential applied by the resistor 5 between the cathode and anode of the tube. Since the tube 22 is a vacuum tube control and since the voltage drop across the resistance 28 changes very steeply, the conduction of the tube 6 is very accurately controlled by the control effected on the grid 8 of the tube. In this manner the voltage is very accurately regulated.

Having now described my invention, I claim:

1. A voltage regulator for an alternating supply source having a field winding energized by direct current, a resistance shunted by both a gaseous control tube and a condenser all connected in series with said field winding, said gaseous control tube having a grid control electrode, a rectifier means operatively connected to said alternating source and providing a voltage controlled in magnitude in accordance with the magnitude of the alternating current source, thermionic control tube means and circuit operatively controlled by said rectifier and having an output element in series with said control grid, and means included in said control tube means and circuit for rapidly varying the voltage in said output element during each alternating current cycle for periodically discharging said tube to vary said field current whereby said voltage source is maintained at its desired value.

2. A voltage regulator for an alternating supply source having a field winding energized by direct current, a resistance shunted by both a gaseous control tube and a condenser all connected in series with said field winding, said gaseous control tube having a grid control electrode, a rectifier means operatively connected to said alternating source and providing a voltage controlled in magnitude in accordance with the magnitude of the alternating current source, thermionic control tube means and circuit having anode, cathode and grid control electrodes and an output element in series with the grid of said gaseous control tube, said thermionic tube having its control grid connected to said rectifier and means for impressing on the cathode-anode circuit of said thermionic tube, a rapidly decreasing potential during the positive half of the alternating wave whereby the potential across said output element rapidly decreases with respect to the critical grid voltage for firing said gaseous control tube to vary the field current whereby said alternating voltage source is maintained at its desired value.

3. A voltage regulator for an alternating supply source having a field winding energized by direct current, a resistance shunted by both a gaseous control tube and a condenser all connected in series with said field winding, said gaseous control tube having a grid control electrode, a rectifier means operatively connected to said alternating source and providing a voltage controlled in magnitude in accordance with the magnitude of the alternating current source, a thermionic vacuum tube control circuit having its input operatively controlled by the voltage provided by said rectifier and its output operatively controlling thereby the variation in voltage on the grid of said gaseous control tube for periodically controlling the discharge of said gaseous control tube, said condenser serving to extinguish said discharge a definite interval thereafter whereby said voltage source is maintained at its desired value.

4. A voltage regulator for an alternating current source having a field winding energized by direct current, a resistance shunted by both a gaseous control tube and a condenser all connected in series with said field winding and all independent of connection with the alternating supply source to be regulated, said gaseous control tube having a grid control electrode and a vacuum control tube and circuit having anode, cathode and grid control electrode, means for impressing a potential derived from the voltage source to be regulated upon the grid circuit of said vacuum control tube, said vacuum control tube having an output circuit with a condenser and impedance connected in shunt with each other therein, said condenser and impedance forming the input to the grid control of said gaseous control tube, the first-mentioned condenser being directly connected from the cathode to the anode of said gaseous control tube for rapidly decreasing the voltage across said gaseous control tube in a uniform manner during each alternating current cycle for periodically discharging said tube to vary said field current whereby said voltage source is maintained at its desired value.

5. A voltage regulator for a supply source, said regulator having an independent direct current supply with an impedance and a gaseous control tube in series across said independent direct current supply, a condenser shunted across said gaseous control tube, said elements being all independent of connection with the supply source whose voltage is to be regulated, said gaseous control tube having a grid control electrode and a vacuum control tube means and circuit having an input with a potential operatively connected to and varying with the voltage source to be regulated and having an output circuit including an impedance and condenser in shunt with one another and connected between the anode and control grid of said gaseous control tube, said condenser being directly connected from cathode to anode of said gaseous control tube for rapidly decreasing the voltage across said gaseous control tube in a uniform manner during each discharge of said control tube to vary said direct current whereby said voltage source is maintained at its desired value.

WILLIAM CHRISTIAN GRABAU.